United States Patent
Redford et al.

(10) Patent No.: US 12,208,958 B2
(45) Date of Patent: Jan. 28, 2025

(54) SEALED STORAGE TANKS AND METHODS OF MAKING THE SAME

(71) Applicant: Viaflex, Inc., Sioux Falls, SD (US)

(72) Inventors: Steven G. Redford, Brandon, SD (US); Stacy Coffin, Billings, MT (US); Nick Lavin, Denver, CO (US); Andre Alan Harvey, Spring Valley, CA (US)

(73) Assignee: Viaflex, Inc., Sioux Falls, SD (US)

( * ) Notice: Subject to any disclaimer, the term of this patent is extended or adjusted under 35 U.S.C. 154(b) by 0 days.

(21) Appl. No.: 18/000,231

(22) PCT Filed: May 27, 2021

(86) PCT No.: PCT/US2021/034653
§ 371 (c)(1),
(2) Date: Nov. 29, 2022

(87) PCT Pub. No.: WO2021/243108
PCT Pub. Date: Dec. 2, 2021

(65) Prior Publication Data
US 2023/0202751 A1    Jun. 29, 2023

Related U.S. Application Data

(60) Provisional application No. 63/032,075, filed on May 29, 2020.

(51) Int. Cl.
*B65D 90/02*    (2019.01)
*B32B 1/00*    (2024.01)
(Continued)

(52) U.S. Cl.
CPC ............. *B65D 90/022* (2013.01); *B32B 1/00* (2013.01); *B32B 3/266* (2013.01); *B32B 7/12* (2013.01);
(Continued)

(58) Field of Classification Search
CPC .......... B65D 90/22; B32B 1/00; B32B 3/266; B32B 7/12; B32B 27/08
(Continued)

(56) References Cited

U.S. PATENT DOCUMENTS

| | | | |
|---|---|---|---|
| 2,484,834 | A | 10/1949 | Keeling |
| 3,100,233 | A | 8/1963 | Rosenberg |

(Continued)

FOREIGN PATENT DOCUMENTS

| | | | |
|---|---|---|---|
| CN | 105383828 A | * | 3/2016 |
| CN | 107054921 A | * | 8/2017 |

(Continued)

OTHER PUBLICATIONS

"International Application Serial No. PCT/US2021/034653, International Search Report mailed Aug. 25, 2021", 2 pgs.

(Continued)

*Primary Examiner* — J. Gregory Pickett
*Assistant Examiner* — Niki M Eloshway
(74) *Attorney, Agent, or Firm* — Schwegman Lundberg & Woessner, P.A.

(57) ABSTRACT

Various embodiments disclosed relate to a sealed storage tank. The sealed storage tank includes a first polymeric layer. The sealed storage tank further includes a second polymeric layer continuously welded to the first polymeric layer to form the sealed storage tank. The sealed storage tank further includes an optional vent formed in the first polymeric layer or the second polymeric layer. The sealed storage tank can be configured to hold at least 13,000 liters of liquid.

23 Claims, 4 Drawing Sheets

(51) Int. Cl.
| | |
|---|---|
| *B32B 3/26* | (2006.01) |
| *B32B 7/12* | (2006.01) |
| *B32B 27/08* | (2006.01) |
| *B32B 27/28* | (2006.01) |
| *B32B 27/30* | (2006.01) |
| *B32B 27/32* | (2006.01) |
| *B32B 27/34* | (2006.01) |
| *B32B 27/36* | (2006.01) |
| *B32B 37/18* | (2006.01) |
| *B65D 88/02* | (2006.01) |

(52) U.S. Cl.
 CPC ............ *B32B 27/08* (2013.01); *B32B 27/288* (2013.01); *B32B 27/304* (2013.01); *B32B 27/306* (2013.01); *B32B 27/322* (2013.01); *B32B 27/34* (2013.01); *B32B 27/36* (2013.01); *B32B 37/182* (2013.01); *B65D 88/02* (2013.01); *B32B 2250/24* (2013.01); *B32B 2307/7265* (2013.01); *B32B 2439/40* (2013.01)

(58) Field of Classification Search
 USPC ......................................................... 220/565
 See application file for complete search history.

(56) References Cited

U.S. PATENT DOCUMENTS

| | | | | |
|---|---|---|---|---|
| 8,758,488 | B1* | 6/2014 | Wickland | ............... B01D 71/36 |
| | | | | 96/9 |
| 2003/0198768 | A1* | 10/2003 | Delbarre | ................ B32B 27/32 |
| | | | | 428/36.6 |
| 2011/0155727 | A1 | 6/2011 | Koyama et al. | |
| 2015/0360560 | A1 | 12/2015 | Tanaka et al. | |
| 2020/0384719 | A1* | 12/2020 | Benson | .................... B32B 5/26 |

FOREIGN PATENT DOCUMENTS

| | | | | |
|---|---|---|---|---|
| WO | WO-2020045467 A1 * | 3/2020 | ......... | B29C 45/0001 |
| WO | WO-2021243108 A1 | 12/2021 | | |

OTHER PUBLICATIONS

"International Application Serial No. PCT/US2021/034653, Written Opinion mailed Aug. 25, 2021", 5 pgs.

"International Application Serial No. PCT US2021 034653, International Preliminary Report on Patentability mailed Dec. 8, 2022", 6 pgs.

"Canadian Application Serial No. 3,180,085, Examiner's Rule 86(2) Requisition mailed Aug. 20, 2024, 3 pgs.".

* cited by examiner

SEALED STORAGE TANKS AND METHODS OF MAKING THE SAME

CROSS REFERENCE TO RELATED APPLICATIONS

This application is a U.S. national stage application filing under 35 U.S.C. 371 from International Application No. PCT/US2021/034653, filed May 27, 2021, and published as WO 2021/243108 A1 on May 27, 2021, which claims the benefit of priority to U.S. Provisional Patent Application Ser. No. 63/032,075 entitled "SEALED STORAGE TANKS AND METHODS OF MAKING THE SAME," filed May 29, 2020, the disclosures of which are incorporated herein in their entirety by reference.

BACKGROUND

Polymeric storage tanks can be used to store a wide variety of liquids. The most useful storage tanks will be able to store large volumes of liquids. However, given the size of these storage tanks, assembly may take too long to justify using polymeric storage tanks or steel tanks. There is therefore a need to develop a hybrid polymeric storage tanks that can be quickly assembled.

SUMMARY OF THE INVENTION

Various embodiments disclosed relate to a sealed storage tank. The sealed storage tank includes a first polymeric layer. The sealed storage tank further includes a second polymeric layer continuously welded to the first polymeric layer to form the sealed storage tank. The sealed storage tank further includes an optional vent formed in the first polymeric layer or the second polymeric layer. The sealed storage tank can be configured to hold at least 13,000 liters of liquid.

Various embodiments disclosed relate to an assembly. The assembly includes a sealed storage tank. The sealed storage tank includes a first polymeric layer. The sealed storage tank further includes a second polymeric layer continuously welded to the first polymeric layer to form the sealed storage tank. The sealed storage tank further includes an optional vent formed in the first polymeric layer or the second polymeric layer. The sealed storage tank can be configured to hold at least 13,000 liters of liquid. The assembly further includes a container. The sealed storage tank is attached to the container.

Various embodiments disclosed relate to a method of making a sealed storage tank. The sealed storage tank includes a first polymeric layer. The sealed storage tank further includes a second polymeric layer continuously welded to the first polymeric layer to form the sealed storage tank. The sealed storage tank further includes an optional vent formed in the first polymeric layer or the second polymeric layer. The sealed storage tank can be configured to hold at least 13,000 liters of liquid. The method includes sizing the first polymeric layer to be larger than the second polymeric layer. The method further includes contacting the first polymeric layer and the second polymeric layer. The method further includes forming a continuous weld between the first polymeric layer and the second polymeric layer to form the sealed storage tank.

Various embodiments disclosed relate to a method of forming an assembly. The assembly includes a sealed storage tank. The sealed storage tank includes a first polymeric layer. The sealed storage tank further includes a second polymeric layer continuously welded to the first polymeric layer to form the sealed storage tank. The sealed storage tank further includes an optional vent formed in the first polymeric layer or the second polymeric layer. The sealed storage tank can be configured to hold at least 13,000 liters of liquid. The assembly further includes a container. The sealed storage tank is attached to the container. The method includes forming the sealed storage tank. Forming the sealed storage tank includes sizing the first polymeric layer to be larger than the second polymeric layer. Forming the sealed storage tank further includes contacting the first polymeric layer and the second polymeric layer. Forming the sealed storage tank further includes forming a continuous weld between the first polymeric layer and the second polymeric layer to form the sealed storage tank. Forming the assembly further includes attaching the sealed storage tank to the container.

BRIEF DESCRIPTION OF THE FIGURES

The drawings illustrate generally, by way of example, but not by way of limitation, various embodiments of the present invention.

DETAILED DESCRIPTION OF THE INVENTION

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

Throughout this document, values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z." unless indicated otherwise.

In this document, the terms "a." "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section.

In the methods described herein, the acts can be carried out in any order without departing from the principles of the disclosure, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

The term "about" as used herein can allow for a degree of variability in a value or range, for example, within 10%, within 5%, or within 1% of a stated value or of a stated limit of a range, and includes the exact stated value or range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more, or 100%.

The term "organic group" as used herein refers to any carbon-containing functional group. Examples can include an oxygen-containing group such as an alkoxy group, aralkyloxy group, a carboxyl group including a carboxylic acid, carboxylate, and a carboxylate ester; a sulfur-containing group such as an alkyl and aryl sulfide group; and other heteroatom-containing groups. Non-limiting examples of organic groups include OR, OOR, OC(O)N(R)$_2$, CN, CF$_3$, OCF$_3$, R, C(O), methylenedioxy, ethylenedioxy, N(R)$_2$, SR, SOR, SO$_2$R, SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(COR)COR, N(OR)R, C(=NH)N(R)$_2$, C(O)N(OR)R, C(=NOR)R, and substituted or unsubstituted (C$_1$-C$_{100}$) hydrocarbyl, wherein R can be hydrogen (in examples that include other carbon atoms) or a carbon-based moiety, and wherein the carbon-based moiety can be substituted or unsubstituted.

The term "substituted" as used herein in conjunction with a molecule or an organic group as defined herein refers to the state in which one or more hydrogen atoms contained therein are replaced by one or more non-hydrogen atoms. The term "functional group" or "substituent" as used herein refers to a group that can be or is substituted onto a molecule or onto an organic group. Examples of substituents or functional groups include, but are not limited to, a halogen (e.g., F, Cl, Br, and I); an oxygen atom in groups such as hydroxy groups, alkoxy groups, carboxyl groups including carboxylic acids, carboxylates, and carboxylate esters; a sulfur atom in groups such as thiol groups, alkyl and aryl sulfide groups, sulfoxide groups, sulfone groups, sulfonyl groups, and sulfonamide groups; a nitrogen atom in groups such as amines, hydroxyamines, nitriles, nitro groups. N-oxides, hydrazides, azides, and enamines; and other heteroatoms in various other groups. Non-limiting examples of substituents that can be bonded to a substituted carbon (or other) atom include F, Cl, Br, I, OR, OC(O)N(R)$_2$, CN, NO, NO$_2$, ONO$_2$, azido, CF$_3$, OCF$_3$, R, O (oxo), S (thiono), C(O), S(O), methylenedioxy, ethylenedioxy, N(R)$_2$, SR, SOR, SO$_2$R, SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2N}$(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(COR)COR, N(OR)R, C(=NH)N(R)$_2$, C(O)N(OR)R, and C(=NOR)R, wherein R can be hydrogen or a carbon-based moiety; for example, R can be hydrogen, (C$_1$-C$_{100}$)hydrocarbyl, alkyl, acyl, cycloalkyl, aryl; or wherein two R groups bonded to a nitrogen atom or to adjacent nitrogen atoms can together with the nitrogen atom or atoms form a heterocyclyl.

The term "alkyl" as used herein refers to straight chain and branched alkyl groups and cycloalkyl groups having from 1 to 40 carbon atoms, 1 to about 20 carbon atoms, 1 to 12 carbons or, in some embodiments, from 1 to 8 carbon atoms. Examples of straight chain alkyl groups include those with from 1 to 8 carbon atoms such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, t-butyl, neopentyl, isopentyl, and 2,2-dimethylpropyl groups. As used herein, the term "alkyl" encompasses n-alkyl, isoalkyl, and anteisoalkyl groups as well as other branched chain forms of alkyl. Representative substituted alkyl groups can be substituted one or more times with any of the groups listed herein, for example, amino, hydroxy, cyano, carboxy, nitro, thio, alkoxy, and halogen groups.

The term "alkenyl" as used herein refers to straight and branched chain and cyclic alkyl groups as defined herein, except that at least one double bond exists between two carbon atoms. Thus, alkenyl groups have from 2 to 40 carbon atoms, or 2 to about 20 carbon atoms, or 2 to 12 carbon atoms or, in some embodiments, from 2 to 8 carbon atoms. Examples include, but are not limited to vinyl, —CH=CH(CH$_3$), —CH=C(CH$_3$)$_2$, —C(CH$_3$)=CH$_2$, —C(CH$_3$)=CH(CH$_3$), —C(CH$_2$CH$_3$)=CH$_2$, cyclohexenyl, cyclopentenyl, cyclohexadienyl, butadienyl, pentadienyl, and hexadienyl among others.

The term "alkynyl" as used herein refers to straight and branched chain alkyl groups, except that at least one triple bond exists between two carbon atoms. Thus, alkynyl groups have from 2 to 40 carbon atoms, 2 to about 20 carbon atoms, or from 2 to 12 carbons or, in some embodiments, from 2 to 8 carbon atoms. Examples include, but are not limited to —C≡CH, —C≡C(CH$_3$), —C≡C(CH$_2$CH$_3$), —CH$_2$C≡CH, —CH$_2$C≡C(CH$_3$), and —CH$_2$C≡C(CH$_2$CH$_3$) among others.

The term "acyl" as used herein refers to a group containing a carbonyl moiety wherein the group is bonded via the carbonyl carbon atom. The carbonyl carbon atom is bonded to a hydrogen forming a "formyl" group or is bonded to another carbon atom, which can be part of an alkyl, aryl, aralkyl cycloalkyl, or cycloalkylalkyl. An acyl group can include 0 to about 12.0 to about 20, or 0 to about 40 additional carbon atoms bonded to the carbonyl group. An acyl group can include double or triple bonds within the meaning herein. An acryloyl group is an example of an acyl group. An acyl group can also include heteroatoms within the meaning herein. A nicotinoyl group (pyridyl-3-carbonyl) is an example of an acyl group within the meaning herein. Other examples include acetyl, benzoyl, phenylacetyl, pyridylacetyl, cinnamoyl, and acryloyl groups and the like. When the group containing the carbon atom that is bonded to the carbonyl carbon atom contains a halogen, the group is termed a "haloacyl" group. An example is a trifluoroacetyl group.

The term "cycloalkyl" as used herein refers to cyclic alkyl groups such as, but not limited to, cyclopropyl, cyclobutyl, cyclopentyl, cyclohexyl, cycloheptyl, and cyclooctyl groups. In some embodiments, the cycloalkyl group can have 3 to about 8-12 ring members, whereas in other embodiments the number of ring carbon atoms range from 3 to 4, 5, 6, or 7. Cycloalkyl groups further include poly-cyclic cycloalkyl groups such as, but not limited to, norbornyl, adamantyl, bornyl, camphenyl, isocamphenyl, and carenyl groups, and fused rings such as, but not limited to, decalinyl, and the like. Cycloalkyl groups also include rings that are substituted with straight or branched chain alkyl groups as defined herein. Representative substituted cycloalkyl groups can be mono-substituted or substituted more than once, such as, but not limited to, 2,2-, 2,3-, 2,4-2,5- or 2,6-disubstituted cyclohexyl groups or mono-, di- or tri-substituted norbornyl or cycloheptyl groups, which can be substituted with, for example, amino, hydroxy, cyano, carboxy, nitro, thio, alkoxy, and halogen groups. The term "cycloalkenyl" alone or in combination denotes a cyclic alkenyl group.

The term "aryl" as used herein refers to cyclic aromatic hydrocarbon groups that do not contain heteroatoms in the ring. Thus, aryl groups include, but are not limited to, phenyl, azulenyl, heptalenyl, biphenyl, indacenyl, fluorenyl, phenanthrenyl, triphenylenyl, pyrenyl, naphthacenyl, chrysenyl, biphenylenyl, anthracenyl, and naphthyl groups. In some embodiments, aryl groups contain about 6 to about 14 carbons in the ring portions of the groups. Aryl groups can be unsubstituted or substituted, as defined herein. Representative substituted aryl groups can be mono-substituted or substituted more than once, such as, but not limited to, a phenyl group substituted at any one or more of 2-, 3-, 4-, 5-, or 6-positions of the phenyl ring, or a naphthyl group substituted at any one or more of 2- to 8-positions thereof.

The term "alkoxy" as used herein refers to an oxygen atom connected to an alkyl group, including a cycloalkyl group, as are defined herein. Examples of linear alkoxy groups include but are not limited to methoxy, ethoxy, propoxy, butoxy, pentyloxy, hexyloxy, and the like. Examples of branched alkoxy include but are not limited to isopropoxy, sec-butoxy, tert-butoxy, isopentyloxy, isohexyloxy, and the like. Examples of cyclic alkoxy include but are not limited to cyclopropyloxy, cyclobutyloxy, cyclopentyloxy, cyclohexyloxy, and the like. An alkoxy group can include about 1 to about 12, about 1 to about 20, or about 1 to about 40 carbon atoms bonded to the oxygen atom, and can further include double or triple bonds, and can also include heteroatoms. For example, an allyloxy group or a methoxyethoxy group is also an alkoxy group within the meaning herein, as is a methylenedioxy group in a context where two adjacent atoms of a structure are substituted therewith.

The term "amine" as used herein refers to primary, secondary, and tertiary amines having. e.g., the formula N(group)$_3$ wherein each group can independently be H or non-H, such as alkyl, aryl, and the like. Amines include but are not limited to R—NH$_2$, for example, alkylamines, arylamines, alkylarylamines; R$_2$NH wherein each R is independently selected, such as dialkylamines, diarylamines, aralkylamines, and the like; and R$_3$N wherein each R is independently selected, such as trialkylamines, dialkylarylamines, alkyldiarylamines, triarylamines, and the like. The term "amine" also includes ammonium ions as used herein.

As used herein, the term "hydrocarbyl" refers to a functional group derived from a straight chain, branched, or cyclic hydrocarbon, and can be alkyl, alkenyl, alkynyl, aryl, cycloalkyl, acyl, or any combination thereof. Hydrocarbyl groups can be shown as (C$_a$-C$_b$)hydrocarbyl, wherein a and b are integers and mean having any of a to b number of carbon atoms. For example, (C$_1$-C$_4$)hydrocarbyl means the hydrocarbyl group can be methyl (C$_1$), ethyl (C$_2$), propyl (C$_3$), or butyl (C$_4$), and (C$_0$-C$_b$)hydrocarbyl means in certain embodiments there is no hydrocarbyl group.

The term "weight-average molecular weight" as used herein refers to M$_w$, which is equal to $\Sigma M_i^2 n_i/\Sigma M_i n_i$, where n$_i$ is the number of molecules of molecular weight M$_i$. In various examples, the weight-average molecular weight can be determined using light scattering, small angle neutron scattering, X-ray scattering, and sedimentation velocity.

As used herein, the term "polymer" refers to a molecule having at least one repeating unit and can include copolymers.

The polymers described herein can terminate in any suitable way. In some embodiments, the polymers can terminate with an end group that is independently chosen from a suitable polymerization initiator, —H, —OH, a substituted or unsubstituted (C$_1$-C$_{20}$)hydrocarbyl (e.g., (C$_1$-C$_{10}$)alkyl or (C$_6$-C$_{20}$)aryl) interrupted with 0, 1, 2, or 3 groups independently selected from —O—, substituted or unsubstituted —NH—, and —S—, a poly(substituted or unsubstituted (C$_1$-C$_{20}$)hydrocarbyloxy), and a poly(substituted or unsubstituted (C$_1$-C$_{20}$)hydrocarbylamino).

Various embodiments of the present disclosure relate a sealed storage tank. The sealed storage tank can be used to store liquids such as water, wine, gasoline, oil, or other hydrocarbons. The volume of the sealed storage tanks can be sized to accommodate liquids in a range of from about 13,000 liters to about 12,720,000 liters, about 6,000,000 liters to about 7,000,000 liters, less than equal to or greater than about, 15 liters, 100, 500, 1,000, 50,000, 100,000, 500,000, 1,000,000, 2,000,000, 3,000,000, 4,000,000, 5,000,000, 6,000,000, 7,000,000, 8,000,000, 9,000,000, 10,000,000, 11,000,000, 12,000,000, or about 12,270,000 liters. The exact volume can vary greatly depending on the desired use of the multi-layer liner and these values are therefore merely used to show examples of suitable volumes.

Figure 1:
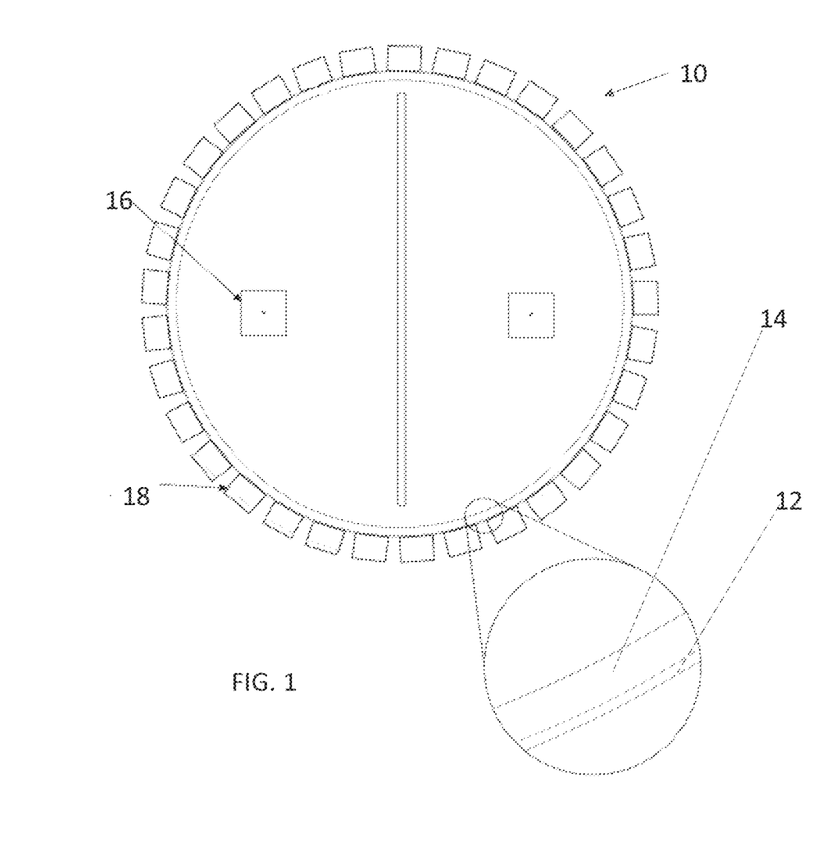
FIG. 1 is a top view of a sealed storage tank laid flat.

FIG. 1 is a top view of sealed storage tank 10. Sealed storage tank 10 includes first polymeric layer 12, second polymeric layer 14, vent 16, and tabs 18. First polymeric layer 12 and second polymeric layer 14 are shown as having circular shapes. However, in further embodiments, either of layers 12 or 14 can have different shapes. As shown, the major dimension (diameter) of first polymeric layer 12 is greater than that of second polymeric layer 14. The major dimension of first polymeric layer 12 and second polymeric layer 14 can independently be in a range of from about 3 meters to about 150 meters, about 30 meters to about 60 meters, less than, equal to, or greater than about 3 meters, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100 meters.

Respective center points of first polymeric layer 12 and second polymeric layer 14 are aligned with each other to ensure that a space between the edge of first polymeric layer 12 and the edge of second polymeric layer 14 is constant. Once first polymeric layer 12 and second polymeric layer 14 are properly aligned, they can be welded to each other using any technique suitable for welding polymers. Examples of such techniques can include hot gas welding, speed tip welding, extrusion welding, contact welding, hot plate welding, infra-red radiation welding, high frequency welding, induction welding, injection welding, ultrasonic welding, friction welding, spin welding, laser welding, solvent welding, or combinations thereof. The weld between first polymeric layer 12 and second polymeric layer 14 is a single continuous weld that can be accomplished in situ at an installation site after the respective first polymeric layer 12 and second polymeric layer 14 are formed. The weld can be formed between the perimeters of first polymeric layer 12 and second polymeric layer 14. Alternatively, the weld can be formed between a perimeter of first polymeric layer 12 and a portion of second polymeric layer 14 or between a perimeter of second polymeric layer 14 and a portion of first polymeric layer 12.

Before or after first polymeric layer 12 and second polymeric layer 14 are joined, a plurality of tabs 18 can be formed. Tabs 18 can be formed from the same material as first polymeric layer 12 or second polymeric layer 14 or a different material. In some examples any one of tabs 18 can include an elastic material that will allow them to absorb forces and protect sealed storage tank 10. Similarly, first polymeric layer 12 and second polymeric layer 14 can have different constituents such as pigments or colorants such that an external facing portion of sealed storage tank 10 is white and another portion is black. Tabs 18 can be welded to first polymeric layer 12 or second polymeric layer 14. Tabs 18 are shown as spaced evenly about the circumference of sealed storage tank 10, but in other examples, the spacing may not be even. Tabs 18 are shown to be shaped as a rectangle each rectangle can be about 0.1 meters to about 12 meters wide, about 2 meters to about 4 meters, less than, equal to, or greater than about 0.5 meters, 1, 1.5, 2, 2.5, 3, 3.5, 4, 4.5, 5, 5.5, 6, 6.5, 7, 7.5, 8, 8.5, 9, 9.5, 10, 10.5, 11, 11.5, or about 12 meters wide and about 0.5 meters to about 20 meters long, about 3 meters to about 7 meters, less than, equal to, or greater than about 0.5 meters, 1, 1.5, 2, 2.5, 3, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5, 15, 15.5, 16, 16.5, 17, 17.5, 18, 18.5, 19, 19.5, or about 20 meters long. At least some of tabs 18 can include a pocket 22 (shown in FIG. 4) that can be used to hold ballast. Including ballast can be helpful when storage tank 10 is not holding a liquid and is exposed to wind and at risk of being blown away. Ballast can also be permanently affixed to either first polymeric layer 12 or second polymeric layer 14. Some embodiments of sealed storage tank 10 can be free of a tab. In such an example the first polymeric layer 12 may be larger in size. In still some further examples, tabs 18 may be smaller and serve as attachment points for ropes or other connectors.

First polymeric layer 12, second polymeric layer 14 or both can independently include a polymer such as a polyolefin, a polyketone, a polyester, a polyamide, ethylene vinyl alcohol, a polyvinylidene fluoride, a polyvinylidene chloride, a polyvinyl alcohol, a polytetrafluoroethylene, copolymers thereof, or mixtures thereof. In instances where first polymeric layer 12 and second polymeric layer 14 include a polyolefin, the polyolefin can be a polyethylene, a polypropylene, copolymers thereof, or mixtures thereof. In some examples the polyethylene can include an ultra high molecular weight polyethylene (UHMWPE), a high-density polyethylene (HDPE), a cross-linked polyethylene (PEX or XLPE), a medium density polyethylene (MDPE), a linear low-density polyethylene (LLDPE), a metallocene catalyzed linear low-density polyethylene (mLLDPE), a low-density polyethylene (LDPE), a very low-density polyethylene (VLDPE), an ultra low-density polyethylene (ULDPE), a copolymer thereof, or a combination thereof.

The polyketone can be in a range of from about 20 wt % to about 100 wt % of first polymeric layer 12, second polymeric layer 14, or both, about 90 wt % to about 100 wt %, or less than, equal to, or greater than about 20 wt %, 25, 30, 35, 40, 45, 50, 55, 60, 65, 70, 75, 80, 85, 90, 95, or about 100 wt %. The polyketone can be any suitable polyketone.

An example of a suitable polyketone can include a polyketone including a repeating unit having the structure according to Formula I:

In Formula I, $R^1$, $R^2$, $R^3$ and $R^4$ can be independently chosen from —H, —OH, substituted or unsubstituted $(C_1-C_{20})$ hydrocarbyl. In further examples the $(C_1-C_{20})$hydrocarbyl is chosen from $(C_1-C_{20})$alkyl, $(C_1-C_{20})$alkenyl, $(C_1-C_{20})$alkynyl, $(C_1-C_{20})$acyl, $(C_1-C_{20})$cycloalkyl, $(C_1-C_{20})$aryl, and $(C_1-C_{20})$alkoxy, combinations thereof.

In additional embodiments, the polyketone can be a copolymer that includes repeating units having the structures according to Formula II:

In Formula II, $R^1$, $R^2$, $R^3$, $R^4$, $R^5$, $R^6$, $R^7$, and $R^8$ can be independently chosen from —H, —OH, substituted or unsubstituted $(C_1-C_{20})$hydrocarbyl. In further embodiments, the $(C_1-C_{20})$hydrocarbyl can be chosen from $(C_1-C_{20})$alkyl, $(C_1-C_{20})$alkenyl, $(C_1-C_{20})$alkynyl, $(C_1-C_{20})$acyl, $(C_1-C_{20})$ cycloalkyl, $(C_1-C_{20})$aryl, and $(C_1-C_{20})$alkoxy, combinations thereof. In further embodiments $R^{10}$ can be —$CH_3$. In further embodiments, $R^1$, $R^2$, $R^3$, $R^4$, $R^5$, $R^6$, $R^7$, and $R^8$ can each be —H. In any embodiment of Formula II, a degree of polymerization of m and n are positive integers and the repeating can be in random, block, or alternating configuration.

In embodiments where the polyketone is a copolymer, the polyketone can include any suitable additional repeating units. For example, the polyketone copolymer can include a repeating unit derived from ethylene, propylene, vinyl chloride, vinylidene chloride, styrene, acrylonitrile, tetrafluoroethylene, methyl methacrylate, vinyl acetate, isoprene, chloroprene, or a mixture thereof.

First polymeric layer 12, second polymeric layer 14, or both may include one polyketone or a mixture of polyketones. Where present as a mixture of polyketones, the polyketones can differ by composition (e.g., different repeating units or arrangement of repeating units). Furthermore, individual polyketone polymers can have different weight-average molecular weights. The weight-average molecular weight of any individual polyketone can be in a range of from about 5000 Daltons to about 50.000 Daltons, about 15,000 Daltons to about 25.000 Daltons, or less than, equal to, or greater than about 5,000 Daltons, 10,000, 15,000, 20,000, 25,000, 30,000, 35,000, 40,000, 45,000, or about 50,000 Daltons.

The choice of polymers in polymeric layer 12 or polymeric layer 14 can depend on the liquid that stored in sealed storage tank 10. For example, if a non-volatile liquid such as water is stored, the polymer may simply be a polyolefin such as a polyethylene or a polypropylene. However, if the liquid includes a volatile organic compound such as those found in oil, it may be necessary for the first polymeric layer 12, second polymeric layer 14, or both to include a barrier type material such as ethylene vinyl alcohol (EVA), a polyketone, a polyester, a polyvinylidene fluoride, a polyvinylidene chloride, a polyvinyl alcohol, a polytetrafluoroethylene, copolymers thereof, or a mixture thereof. Examples of volatile organic compounds can include an aromatic hydrocarbon, a chlorinated hydrocarbon, or a mixture thereof. Examples of aromatic hydrocarbon include benzene, toluene, ethylbenzene, xylene, or a mixture thereof. Examples of chlorinated hydrocarbon include 1,2-dichloroethane (1,2-DCA), dichlormethane (DCM), trichloroethylene (TCE), tetrachloroethylene (PCE), or a mixture thereof. According to various examples, sealed storage tank 10 can have a permeability to a volatile organic compound in a range of from about $1 \times 10^{-14}$ m$^2$/s to about $30 \times 10^{-14}$ m$^2$/s, about $1.4 \times 10^{-14}$ m$^2$/s to about $25 \times 10^{-14}$ m$^2$/s, less than, equal to, or greater than about $1 \times 10^{-14}$ m$^2$/s, $1.4 \times 10^{-14}$, $2 \times 10^{-14}$, $2.5 \times 10^{-14}$, $3 \times 10^{-14}$, $4 \times 10^{-14}$, $5 \times 10^{-14}$, $6 \times 10^{-14}$, $7 \times 10^{-14}$, $8 \times 10^{-14}$, $9 \times 10^{-14}$, $10 \times 10^{-14}$, $11 \times 10^{-14}$, $12 \times 10^{-14}$, $13 \times 10^{-14}$, $14 \times 10^{-14}$, $15 \times 10^{-14}$, $16 \times 10^{-14}$, $17 \times 10^{-14}$, $18 \times 10^{-14}$, $19 \times 10^{-14}$, $20 \times 10^{-14}$, $21 \times 10^{-14}$, $22 \times 10^{-14}$, $23 \times 10^{-14}$, $24 \times 10^{-14}$, $25 \times 10^{-14}$, $26 \times 10^{-14}$, $27 \times 10^{-14}$, $28 \times 10^{-14}$, $29 \times 10^{-14}$, or about $30 \times 10^{-14}$ m$^2$/s.

Vent 16 may be a fitting that can be an opening, a fill port, a discharge port, a vent port, or a combination thereof. In some examples, one fitting can perform multiple functions. The fitting can include a metal, a plastic, or a combination thereof. In some examples, where it is desired for the fitting to be at or near the top of the tank, the multiplayer liner can include a float positioned proximate to the fitting.

Overall, a thickness of sealed storage tank 10 can be in a in a range of from about 0.02 mm to about 1.5 mm, about 0.3 mm to about 0.9 mm, about 0.1 mm to about 0.3 mm, less than, equal to, or greater than about 0.02 mm, 0.03, 0.04, 0.05, 0.06, 0.07, 0.08, 0.09, 0.1, 0.2, 0.3, 0.4, 0.5, 0.6, 0.7, 0.8, 0.9, 1, 1.1, 1.2, 1.3, 1.4, or about 1.5 mm.

Figure 2:
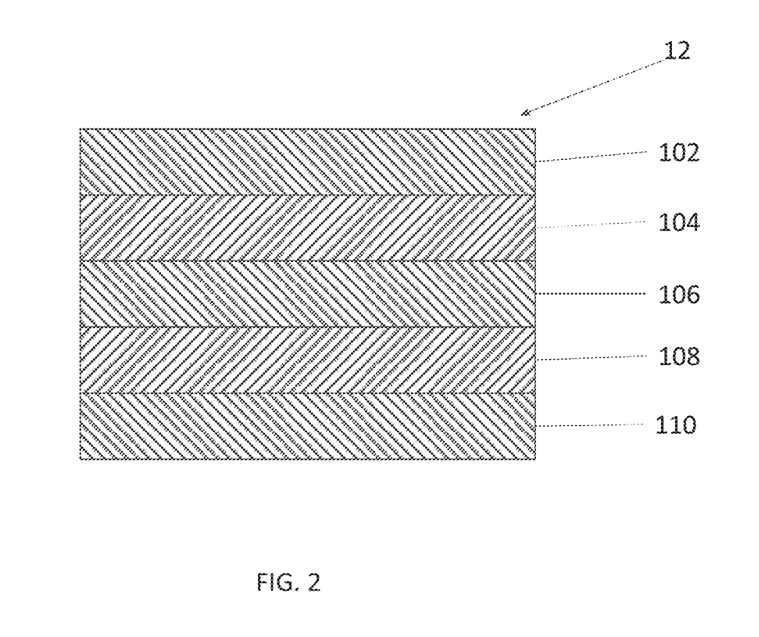
FIG. 2 is a sectional view of an example of a multi-layer first polymeric material.

According to some examples, either first polymeric layer 12, second polymeric layer 14, or both can be formed from a multi-layer construction. FIG. 2 is a sectional view of an example of a multi-layer first polymeric material 12 although second polymeric layer 14 could be identically constructed. As shown in FIG. 2, first polymeric layer 12 includes first polyolefin layer 102; first tie layer 104; barrier layer 106; second tie layer 108, and second polyolefin layer 110. According to various examples, first polyolefin layer 102 and second polyolefin layer 110 can independently include a polyethylene, a polypropylene, copolymers thereof, or mixtures thereof. Where the polymer is a polyethylene, the polyethylene can include an ultra high molecular weight polyethylene (UHMWPE), a high-density polyethylene (HDPE), a cross-linked polyethylene (PEX or XLPE), a medium density polyethylene (MDPE), a linear low-density polyethylene (LLDPE), a metallocene catalyzed linear low-density polyethylene (mLLDPE), a low-density polyethylene (LDPE), a very low-density polyethylene (VLDPE), an ultra low-density polyethylene (ULDPE), a copolymer thereof, or a combination thereof. The polyolefin of first polyolefin layer 102 and second polyolefin layer 110 can be the same or different. In some examples, first polyolefin layer 102, second polyolefin layer 110, or both can be a monolayer or a multi-layer structure including multiple polyolefin layers.

First polyolefin layer 102 and second polyolefin layer 110 define the respective internal and external surfaces of first polymeric layer 12. By virtue of second polyolefin layer 110 defining an external surface of multi-layer liner 100, it can be necessary to include one or more additives in second polyolefin layer 110. For example, second polyolefin layer 110 can include pigments to give second polyolefin layer a white color, which can help it to reflect heat. Second polyolefin layer 110 can also include an antistatic additive to help prevent the accumulation of static electricity thereon to reduce the risk of first polymeric layer 12 being struck by lightning. Additionally, second polyolefin layer 110 can include an ultraviolet radiation resistance additive or a flame retardant. Examples of suitable flame retardants include, for example, organophosphorous compounds such as organic phosphates (including trialkyl phosphates such as triethyl phosphate, tris(2-chloropropyl)phosphate, and triaryl phosphates such as triphenyl phosphate and diphenyl cresyl phosphate, resorcinol bis-diphenylphosphate, resorcinol diphosphate, and aryl phosphate), phosphites (including trialkyl phosphites, triaryl phosphites, and mixed alkyl-aryl phosphites), phosphonates (including diethyl ethyl phosphonate, dimethyl methyl phosphonate), polyphosphates (including melamine polyphosphate, ammonium polyphosphates), polyphosphites, polyphosphonates, phosphinates (including aluminum tris(diethyl phosphinate); halogenated fire retardants such as chlorendic acid derivatives and chlorinated paraffins; organobromines, such as decabromodiphenyl ether (decaBDE), decabromodiphenyl ethane, polymeric brominated compounds such as brominated polystyrenes, brominated carbonate oligomers (BCOs), brominated epoxy oligomers (BEOs), tetrabromophthalic anhydride, tetrabromobisphenol A (TBBPA) and hexabromocyclododecane (HBCD); metal hydroxides such as magnesium hydroxide, aluminum hydroxide, cobalt hydroxide, and hydrates of the foregoing metal hydroxide; and combinations thereof. The flame retardant can be a reactive type flame-retardant (including polyols which contain phosphorus groups, 10-(2,5-dihydroxyphenyl)-10H-9-oxa-10-phospha-phenanthrene-10-oxide, phosphorus-containing lactone-modified polyesters, ethylene glycol bis(diphenyl phosphate), neopentylglycol bis(diphenyl phosphate), amine- and hydroxyl-functionalized siloxane oligomers). These flame retardants can be used alone or in conjunction with other flame retardants.

First polyolefin layer 102 can include any of the same additives as second polyolefin layer 110. However, because first polyolefin layer 102 defines an internal surface, it may not be necessary for first polyolefin layer 102 to include the same additives. In some examples, first polyolefin layer 102 includes a pigment to make it have a different color than second polyolefin layer 110. For example, if second polyolefin layer 110 is white, first polyolefin layer 102 can be gray. This can be helpful, for example, to allow a user to quickly determine what is the internal surface and the external surface when assembling multi-layer liner 100.

Barrier layer 106 is positioned between first polyolefin layer 102 and second polyolefin layer 110. A thickness of barrier layer 106 can be between about 0.005 mm to about 0.05 mm, about 0.015 mm to about 0.02 mm, less than, equal to, or greater than about 0.005 mm, 0.006, 0.007, 0.008, 0.009, 0.01, 0.02, 0.03, 0.04, or about 0.05 mm. Barrier layer 106 functions to help to prevent the transmission of volatile organic compounds from first polyolefin layer 102 to second polyolefin layer 110. According to various examples, barrier layer 106 can help multi-layer liner 100 to achieve a permeability to a volatile organic compound in a range of from about $1\times10^{-14}$ m²/s to about $30\times10^{-14}$ m²/s, about $1.4\times10^{-14}$ m²/s to about $25\times10^{-14}$ m²/s, less than, equal to, or greater than about $1\times10^{-14}$ m²/s, $1.4\times10^{-14}$, $2\times10^{-14}$, $2.5\times10^{-14}$, $3\times10^{-14}$, $4\times10^{-14}$, $5\times10^{-14}$, $6\times10^{-14}$, $7\times10^{-14}$, $8\times10^{-14}$, $9\times10^{-14}$, $10\times10^{-14}$, $11\times10^{-14}$, $12\times10^{-14}$, $13\times10^{-14}$, $14\times10^{-14}$, $15\times10^{-14}$, $16\times10^{-14}$, $17\times10^{-14}$, $18\times10^{-14}$, $19\times10^{-14}$, $20\times10^{-14}$, $21\times10^{-14}$, $22\times10^{-14}$, $23\times10^{-14}$, $24\times10^{-14}$, $25\times10^{-14}$, $26\times10^{-14}$, $27\times10^{-14}$, $28\times10^{-14}$, $29\times10^{-14}$, or about $30\times10^{-14}$ m²/s.

The material of barrier layer 106 can be dissimilar from that of first polyolefin layer 102, second polyolefin layer 110, or both. For example, barrier layer 106 can include ethylene vinyl alcohol, a polyketone (such as those described herein), a polyester, a polyvinylidene fluoride, a polyvinylidene chloride, a polyvinyl alcohol, a polytetrafluoroethylene, copolymers thereof, or a mixture thereof.

Because barrier layer 106 is generally formed from a dissimilar material relative to first polyolefin layer 102, second polyolefin layer 110, or both, a tie layer can be used to join the components of multi-layer liner 100. For example, as shown in FIG. 2, first tie layer 104 joins first polyolefin layer 102 and barrier layer 106 while second tie layer 108 joins barrier layer 106 and second polyolefin layer 110. Examples of suitable tie layers include an anhydride (e.g., malic anhydride), an acrylate (e.g., a methyl acrylate), or a combination thereof.

Multi-layer liner 100 can further include a reinforcing layer or scrim to help to provide strength. In some examples, the reinforcing layer can be positioned adjacent to second polyolefin layer 110. In still further examples, the reinforcing layer can be in contact with second polyolefin layer 110 such that it is at least partially embedded therein. The reinforcing layer can include a woven or non-woven material fully embedded therein. For example, the woven or non-woven can include any suitable reinforcing material. For example, the reinforcing material can include a woven material, a non-woven material, or a mixture thereof. Examples of woven or non-woven materials can include fiber glass, nylon, cotton, cellulosic fiber, wool, rubber, or mixtures thereof. In some examples, the reinforcing layer can include a 9×9 pattern of 1000 denier woven polyester fibers.

Figure 3:
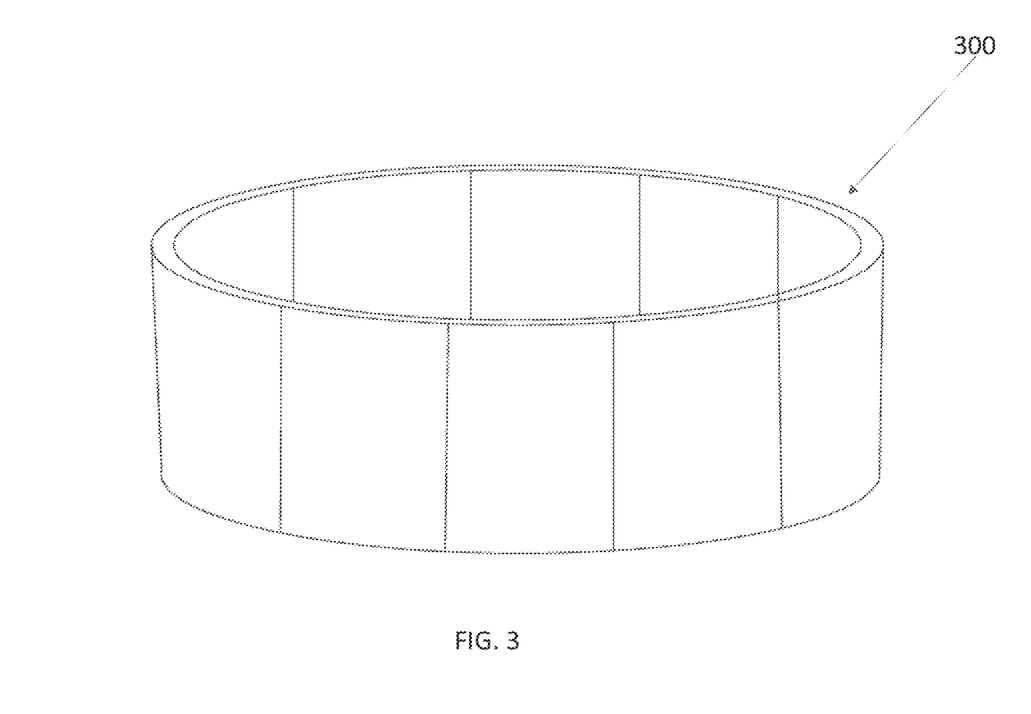
FIG. 3 is a perspective view of a container.

Sealed storage tank 10 can be incorporated into an assembly. The assembly can include sealed storage tank 10 and container 300. FIG. 3 is a perspective view of container 300. Container 300 can be a metal, composite, or a plastic. Alternatively, container 300 can be an Earth berm (e.g., the frame can be the side of hole dug out of the Earth). Container 300 can further include an optional drape material that can coat container 300 to protect sealed storage tank 10 (not shown in FIG. 3) from container 300. The drape material (or step liner) can be a woven material such as a tarp. Although container 300 is shown without a bottom, it possible, in some examples, for container 300 to include a bottom. However, it can be acceptable for container 300 to be free of a bottom such that sealed storage tank 10 simply contacts the Earth.

Figure 4:
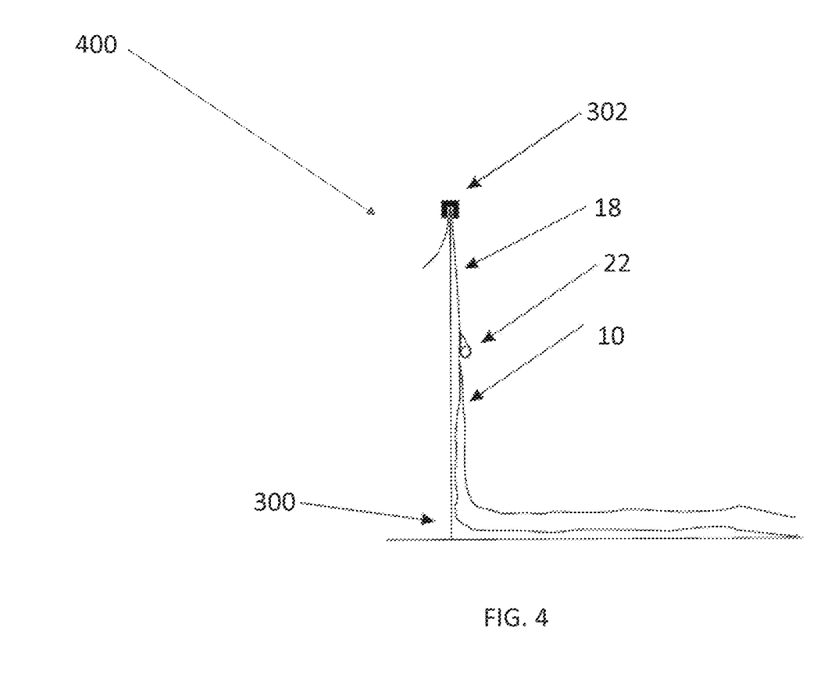
FIG. 4 is a partial sectional view of an assembly including a sealed storage tank and a container.

FIG. 4 is a partial sectional view of assembly 400 including sealed storage tank 10 and container 300. As shown in FIG. 4, sealed storage tank 10 is in a substantially un-filled state and is disposed inside of container 300. As shown in FIG. 4, sealed storage tank 10 is clamped to container 300. Specifically, tab 18 extends from sealed storage tank 10 and folds over the top of container 300. Tab 18 is then clamped to container 300 by clamp 302. In some alternative examples, tab 18 can be welded to container 300. At least some of tabs 18 can include a height indicator that can be aligned with the top of container 300. Once the height indicator is aligned with the top of container 300. The installer can clamp tab 18. In some examples, at least some tabs can include a tie off point to allow an installer to attach a rope to tab 18 to assist in pulling tab over the top of container 300.

Assembly 400 can be rapidly formed. As an example, assembly 400 can be formed by providing first polymeric layer 12 and second polymeric layer at an installation site. First polymeric layer 12 and second polymeric layer 12 can be rapidly joined through a continuous weld. If tabs 18 are not already joined to either first polymeric layer 12 or second polymeric layer 14, tabs 18 can be welded to either layer 12 or 14. Similarly if pockets 22 are not already joined to either first polymeric layer 12 or second polymeric layer 14, pockets 22 can be welded to either layer 12 or 14 and ballast can be disposed therein. Fittings such as vents 16 can be formed in first polymeric layer 12, second polymeric layer 14, or both and any pipes or further components can be attached to vent 16. If container 300 is pre-assembled, first polymeric layer 12 and second polymeric layer 14 can be placed inside of container 300 before the continuous weld between first polymeric layer 12 and second polymeric layer 14 are joined.

Alternatively, container 300 can be formed after sealed storage tank 10 is formed. For example, sealed storage tank 10 can be formed and then segments of container 300 can be joined together. Tabs 18 are then fastened to container 300 to form assembly 400.

Exemplary Embodiments

The following exemplary embodiments are provided, the numbering of which is not to be construed as designating levels of importance:

Embodiment 1 provides a sealed storage tank comprising:
a first polymeric layer;
a second polymeric layer continuously welded to the first polymeric layer to form the sealed storage tank; and
optionally, a vent formed in the first polymeric layer or the second polymeric layer, wherein
the sealed storage tank is configured to hold at least 13,000 liters.

Embodiment 2 provides the sealed storage tank of Embodiment 1, wherein a major dimension of the first polymeric layer is larger than a major dimension of the second polymeric layer.

Embodiment 3 provides the sealed storage tank of Embodiment 2, wherein the first and second major dimensions are a first diameter and a second diameter.

Embodiment 4 provides the sealed storage tank of any one of Embodiments 1-3, further comprising a plurality of tabs welded to the second polymeric layer.

Embodiment 5 provides the sealed storage tank of Embodiment 4, wherein the plurality of tabs are evenly spaced with respect to each other.

Embodiment 6 provides the sealed storage tank of any one of Embodiments 4 or 5, further wherein at least one of the plurality of tabs comprises a pocket.

Embodiment 7 provides the sealed storage tank of Embodiment 6, further comprising ballast at least partially disposed in the pocket.

Embodiment 8 provides the sealed storage tank of any one of Embodiments 4-7, wherein each of the plurality of tabs comprises the same material as the first polymeric layer, second polymeric layer, or both.

Embodiment 9 provides the sealed storage tank of any one of Embodiments 1-8, further comprising a permanent ballast affixed to the first polymeric layer.

Embodiment 10 provides the sealed storage tank of any one of Embodiments 1-9, wherein the first polymeric layer, second polymeric layer, or both independently comprise a polyolefin, a polyketone, a polyester, a polyamide, ethylene vinyl alcohol, a polyvinylidene fluoride, a polyvinylidene chloride, a polyvinyl alcohol, a polytetrafluoroethylene, copolymers thereof, or mixtures thereof.

Embodiment 11 provides the sealed storage tank of Embodiment 10, wherein the polyolefin comprises a polyethylene, a polypropylene, copolymers thereof, or mixtures thereof.

Embodiment 12 provides the sealed storage tank of any one of Embodiments 10 or 11, wherein the polyethylene comprises an ultra high molecular weight polyethylene (UHMWPE), a high-density polyethylene (HDPE), a crosslinked polyethylene (PEX or XLPE), a medium density polyethylene (MDPE), a linear low-density polyethylene (LLDPE), a metallocene catalyzed linear low-density polyethylene (mLLDPE), a low-density polyethylene (LDPE), a very low-density polyethylene (VLDPE), an ultra low-density polyethylene (ULDPE), a copolymer thereof, or a combination thereof.

Embodiment 13 provides the sealed storage tank of any one of Embodiments 10-12, wherein the polyethylene comprises a high-density polyethylene (HDPE), a low-density polyethylene (LDPE), a copolymer thereof, or a mixture thereof.

Embodiment 14 provides the sealed storage tank of any one of Embodiments 1-13, wherein the first polymeric layer and the second polymeric layer comprise the same material.

Embodiment 15 provides the sealed storage tank of any one of Embodiments 1-14, wherein the first polymeric layer and the second polymeric layer comprise a different material.

Embodiment 16 provides the sealed storage tank of any one of Embodiments 10-15, wherein the polyketone layer comprises a polyketone in a range of from about 2.5 wt % to about 100 wt % of the polyketone layer.

Embodiment 17 provides the sealed storage tank of any one of Embodiments 10-16, wherein polyketone comprises an aliphatic polyketone, an aromatic polyketone, or mixtures thereof.

Embodiment 18 provides the sealed storage tank of any one of Embodiments 10-17, wherein the polyketone comprises a repeating unit having the structure according to Formula I:

wherein $R^1$, $R^2$, $R^3$ and $R^4$ are independently chosen from —H, —OH, and substituted or unsubstituted $(C_1-C_{20})$ hydrocarbyl.

Embodiment 19 provides the sealed storage tank of Embodiment 18, wherein the $(C_1-C_{20})$hydrocarbyl is chosen from $(C_1-C_{20})$alkyl, $(C_1-C_{20})$alkenyl, $(C_1-C_{20})$alkynyl, $(C_1-C_{20})$acyl, $(C_1-C_{20})$cycloalkyl, $(C_1-C_{20})$aryl, $(C_1-C_{20})$alkoxy, and combinations thereof.

Embodiment 20 provides the sealed storage tank of any one of Embodiments 18 or 19, wherein the polyketone comprises repeating units according to Formula II:

wherein
$R^1$, $R^2$, $R^3$, $R^4$, $R^5$, $R^6$, $R^7$, and $R^8$ are independently chosen from —H, —OH, and substituted or unsubstituted $(C_1-C_{20})$hydrocarbyl,
wherein m and n are positive integers and represent a degree of polymerization, and
the repeating units shown in Formula II are in random, block, or alternating configuration.

Embodiment 21 provides the sealed storage tank of any one of Embodiments 18-20, wherein the $(C_1-C_{20})$hydrocarbyl is chosen from $(C_1-C_{20})$alkyl, $(C_1-C_{20})$alkenyl, $(C_1-C_{20})$ alkynyl, $(C_1-C_{20})$acyl, $(C_1-C_{20})$cycloalkyl, $(C_1-C_{20})$aryl, $(C_1-C_{20})$alkoxy, and combinations thereof.

Embodiment 22 provides the sealed storage tank of any one of Embodiments 18-21, wherein $R^8$ is —$CH_3$.

Embodiment 23 provides the sealed storage tank of any one of Embodiments 18-22, wherein $R^1$, $R^2$, $R^3$, $R^4$, $R^5$, $R^6$, $R^7$, and $R^8$ are each —H.

Embodiment 24 provides the sealed storage tank of any one of Embodiments 10-23, wherein the polyketone is a copolymer and further comprises a repeating unit derived from ethylene, propylene, vinyl chloride, vinylidene chloride, styrene, acrylonitrile, tetrafluoroethylene, methyl methacrylate, vinyl acetate, isoprene, chloroprene, or a mixture thereof.

Embodiment 25 provides the sealed storage tank of any one of Embodiments 10-24, wherein the polyketone layer comprises a plurality of polyketone polymers having different weight-average molecular weights.

Embodiment 26 provides the sealed storage tank of any one of Embodiments 1-25, wherein the sealed storage tank has a volume in a range of from about 13,000 liters to about 12,270,000 liters.

Embodiment 27 provides the sealed storage tank of any one of Embodiments 1-26, wherein the sealed storage tank has a volume in a range of from about 6,000,000 liters to about 7,000,000 liters.

Embodiment 28 provides the sealed storage tank of any one of Embodiments 1-27, wherein a permeability of the sealed storage tank to a volatile organic compound is in a range of from about $1 \times 10^{-14}$ m$^2$/s to about $30 \times 10^{-14}$ m$^2$/s.

Embodiment 29 provides the sealed storage tank of any one of Embodiments 1-28, wherein a permeability of the sealed storage tank to a volatile organic compound is in a range of from about $1.4 \times 10^{-14}$ m$^2$/s to about $25 \times 10^{-14}$ m$^2$/s.

Embodiment 30 provides the sealed storage tank of any one of Embodiments 28 or 29, wherein the volatile organic compound comprises an aromatic hydrocarbon, a chlorinated hydrocarbon, or a mixture thereof.

Embodiment 31 provides the sealed storage tank of Embodiment 30, wherein the aromatic hydrocarbon comprises benzene, toluene, ethylbenzene, xylene, or a mixture thereof.

Embodiment 32 provides the sealed storage tank of any one of Embodiments 30 or 31, wherein the chlorinated hydrocarbon comprises 1,2-dichloroethane (1,2-DCA), dichloromethane (DCM), trichloroethylene (TCE), tetrachloroethylene (PCE), or a mixture thereof.

Embodiment 33 provides the sealed storage tank of any one of Embodiments 28-32, wherein the volatile organic compound is a constituent of oil.

Embodiment 34 provides the sealed storage tank of any one of Embodiments 1-33, further comprising a float in contact with the first polymeric layer, second polymeric layer, or both.

Embodiment 35 provides the sealed storage tank of any one of Embodiments 1-34, wherein a thickness of the sealed storage tank is in a range of from about 0.02 mm to about 1 mm.

Embodiment 36 provides the sealed storage tank of any one of Embodiments 1-35, wherein a thickness of the sealed storage tank is in a range of from about 0.3 mm to about 0.5 mm.

Embodiment 37 provides the sealed storage tank of any one of Embodiments 1-36, wherein the first polymeric layer and the second polymeric layer are different colors.

Embodiment 38 provides the sealed storage tank of any one of Embodiments 1-37, wherein the first polymeric layer, second polymeric layer, or both comprise a multi-layer construction comprising:
 a first polyolefin layer;
 a barrier layer;
 a first tie layer joining the first polyolefin layer and the barrier layer;
 a second polyolefin layer; and
 a second tie layer joining the barrier layer and the second polyolefin layer.

Embodiment 39 provides the sealed storage tank of Embodiment 38, wherein the first polyolefin layer and second polyolefin layer, independently comprises a polyethylene, a polypropylene, copolymers thereof, or mixtures thereof.

Embodiment 40 provides the sealed storage tank of Embodiment 39, wherein the polyethylene of the first polyolefin layer, second polyolefin layer, or both independently comprises an ultra high molecular weight polyethylene (UHMWPE), a high-density polyethylene (HDPE), a cross-linked polyethylene (PEX or XLPE), a medium density polyethylene (MDPE), a linear low-density polyethylene (LLDPE), a metallocene catalyzed linear low-density polyethylene (mLLDPE), a low-density polyethylene (LDPE), a very low-density polyethylene (VLDPE), an ultra low-density polyethylene (ULDPE), a copolymer thereof, or a combination thereof.

Embodiment 41 provides the sealed storage tank of any one of Embodiments 39 or 40 wherein the polyethylene of the first polyolefin layer, second polyolefin layer, or both independently comprises a high-density polyethylene (HDPE), a low-density polyethylene (LDPE), a copolymer thereof, or a mixture thereof.

Embodiment 42 provides the sealed storage tank of any one of Embodiments 39-41 wherein the polyethylene of the first polyolefin layer, second polyolefin layer, or both comprise a high-density polyethylene (HDPE).

Embodiment 43 provides the sealed storage tank of any one of Embodiments 39-42, wherein the polyethylene of the first polyolefin layer and the polyethylene of the second polyolefin layer comprise the same polyethylene.

Embodiment 44 provides the sealed storage tank of any one of Embodiments 39-43, wherein the first polyolefin layer, second polyolefin layer, or both comprise a pigment or colorant.

Embodiment 45 provides the sealed storage tank of any one of Embodiments 39-44, wherein the second polyolefin layer is white.

Embodiment 46 provides the sealed storage tank of any one of Embodiments 39-45, wherein the first polyolefin layer is gray.

Embodiment 47 provides the sealed storage tank of Embodiments 39-46, wherein a thickness of the barrier layer is in a range of from about 0.005 mm to about 0.05 mm.

Embodiment 48 provides the sealed storage tank of any one of Embodiments 39-47 wherein a thickness of the barrier layer is in a range of from about 0.015 mm to about 0.02 mm.

Embodiment 49 provides the sealed storage tank of Embodiments 39-48, wherein the barrier layer comprises ethylene vinyl alcohol, a polyketone, a polyester, a polyvinylidene fluoride, a polyvinylidene chloride, a polyvinyl alcohol, a polytetrafluoroethylene, copolymers thereof, or a mixture thereof.

Embodiment 50 provides the sealed storage tank of Embodiment 49, wherein the polyketone layer comprises a polyketone in a range of from about 2.5 wt % to about 100 wt % of the polyketone layer.

Embodiment 51 provides the sealed storage tank of any one of Embodiments 49 or 50, wherein polyketone comprises an aliphatic polyketone, an aromatic polyketone, or mixtures thereof.

Embodiment 52 provides the sealed storage tank of any one of Embodiments 49-51, wherein the polyketone comprises a repeating unit having the structure according to Formula I:

wherein $R^1$, $R^2$, $R^3$ and $R^4$ are independently chosen from —H, —OH, and substituted or unsubstituted ($C_1$-$C_{20}$) hydrocarbyl.

Embodiment 53 provides the sealed storage tank of Embodiment 52, wherein the ($C_1$-$C_{20}$)hydrocarbyl is chosen from ($C_1$-$C_{20}$)alkyl, ($C_1$-$C_{20}$)alkenyl, ($C_1$-$C_{20}$)alkynyl, ($C_1$-$C_{20}$)acyl, ($C_1$-$C_{20}$)cycloalkyl, ($C_1$-$C_{20}$)aryl, ($C_1$-$C_{20}$)alkoxy, and combinations thereof.

Embodiment 54 provides the sealed storage tank of any one of Embodiments 52 or 53, wherein the polyketone comprises repeating units according to Formula II:

wherein

R$^1$, R$^2$, R$^3$, R$^4$, R$^5$, R$^6$, R$^7$, and R$^8$ are independently chosen from —H, —OH, and substituted or unsubstituted (C$_1$-C$_{20}$)hydrocarbyl, wherein m and n are positive integers and represent a degree of polymerization, and the repeating units shown in Formula II are in random, block, or alternating configuration.

Embodiment 55 provides the sealed storage tank of any one of Embodiments 52-54, wherein the (C$_1$-C$_{20}$)hydrocarbyl is chosen from (C$_1$-C$_{20}$)alkyl, (C$_1$-C$_{20}$)alkenyl, (C$_1$-C$_{20}$)alkynyl, (C$_1$-C$_{20}$)acyl, (C$_1$-C$_{20}$)cycloalkyl, (C$_1$-C$_{20}$)aryl, (C$_1$-C$_{20}$)alkoxy, and combinations thereof.

Embodiment 56 provides the sealed storage tank of any one of Embodiments 54-55 wherein R$^8$ is —CH$_3$.

Embodiment 57 provides the sealed storage tank of any one of Embodiments 54-56, wherein R$^1$, R$^2$, R$^3$, R$^4$, R$^5$, R$^6$, R$^7$, and R$^8$ are each —H.

Embodiment 58 provides the sealed storage tank of any one of Embodiments 49-57, wherein the polyketone is a copolymer and further comprises a repeating unit derived from ethylene, propylene, vinyl chloride, vinylidene chloride, styrene, acrylonitrile, tetrafluoroethylene, methyl methacrylate, vinyl acetate, isoprene, chloroprene, or a mixture thereof.

Embodiment 59 provides the sealed storage tank of any one of Embodiments 49-58, wherein the polyketone layer comprises a plurality of polyketone polymers having different weight-average molecular weights.

Embodiment 60 provides the sealed storage tank of any one of Embodiments 39-59, further comprising an antistatic additive, ultra violet resistance additive, antioxidant additive, or a combination thereof, distributed about the second polyolefin layer.

Embodiment 61 provides the sealed storage tank of any one of Embodiments 39-60, further comprising a reinforcing layer adjacent to the second polyolefin layer.

Embodiment 62 provides the sealed storage tank of Embodiment 61, wherein the reinforcing layer is in contact with the second polyolefin layer.

Embodiment 63 provides the sealed storage tank of any one of Embodiments 61 or 62, wherein the reinforcing layer is at least partially embedded within the second polyolefin layer.

Embodiment 64 provides the sealed storage tank of any one of Embodiments 61-63, wherein the reinforcing layer comprises a woven or non-woven material comprising fiber glass, nylon, cotton, cellulosic fiber, wool, rubber, a polyester, or a mixture thereof.

Embodiment 65 provides the sealed storage tank of Embodiment 64, wherein the polyester of the reinforcing layer comprises a 9×9 pattern of 1000 denier woven polyester fibers.

Embodiment 66 provides the sealed storage tank of any one of Embodiments 39-65, wherein the first tie layer, second tie layer, or both comprise an anhydride.

Embodiment 67 provides an assembly comprising:

the sealed storage tank of any one of any one of Embodiments 1-66; and a container, wherein the sealed storage tank is attached to the container.

Embodiment 68 provides the assembly of Embodiment 67, wherein the container is a metal container, a plastic container, an earth berm, or a combination thereof.

Embodiment 69 provides the assembly of any one of Embodiments 67-68, wherein the sealed storage tank is welded to the container.

Embodiment 70 provides the assembly of any one of Embodiments 67-69, wherein at least one of the plurality of tabs is welded to the container.

Embodiment 71 provides the assembly of any one of Embodiments 67-70, wherein the sealed storage tank is clamped to the container.

Embodiment 72 provides the assembly of any one of Embodiments 67-71, wherein at least one of the plurality of tabs is clamped to the container.

Embodiment 73 provides the assembly of any one of Embodiments 67-72, further comprising a liner disposed between an inner surface of the container and the sealed storage tank Embodiment 74 provides the assembly of any one of Embodiments 67-73, wherein the container comprises a plurality of segments joined together.

Embodiment 75 provides the assembly of any one of Embodiments 73 or 74, further comprising a standpipe disposed between the liner and the sealed storage tank.

Embodiment 76 provides a method of making the sealed storage tank of any one of Embodiments 1-75, the method comprising:

sizing the first polymeric layer to be larger than the second polymeric layer;

contacting the first polymeric layer and the second polymeric layer, and forming a continuous weld between the first polymeric layer and the second polymeric layer to form the sealed storage tank.

Embodiment 77 provides the method of Embodiment 76, further comprising attaching a fitting to first polymeric layer, second polymeric layer, or both.

Embodiment 78 provides the method of Embodiment 77, wherein attaching the fitting comprises:

forming a hole in the first polymeric layer, second polymeric layer, or both;

disposing the fitting in the hole; and welding the fitting to the first polymeric layer, second polymeric layer, or both.

Embodiment 79 provides the method of any one of Embodiments 76-78, further comprising attaching the plurality of tabs to the first polymeric layer, second polymeric layer, or both.

Embodiment 80 provides the method of any one of Embodiments 76-79, further comprising substantially aligning a center of the first polymeric layer with a center of the second polymeric layer.

Embodiment 81 provides a method of forming the assembly of any one of Embodiments 67-75, the method comprising:

forming the sealed storage tank according to any one of Embodiments 76-80; and attaching the sealed storage tank to the container.

Embodiment 82 provides the method of Embodiment 81, wherein attaching the sealed storage tank to the container comprises:

folding at least one of the plurality of tabs over a top end of the container; and clamping the at least one tab to the top end of the container.

Embodiment 83 provides the method of Embodiment 81, wherein attaching the sealed storage tank to the container comprises:

folding at least one of the plurality of tabs over a top end of the container; and welding the at least one tab to the top end of the container.

Embodiment 84 provides the method of any one of Embodiments 81-83, further comprising disposing a liner between an inner surface of the container and the sealed storage tank.

What is claimed is:

1. A sealed storage tank comprising:
   a first polymeric layer;
   a second polymeric layer continuously welded to the first polymeric layer to form the sealed storage tank;
   a vent formed in the first polymeric layer or the second polymeric layer; and
   a plurality of tabs welded to the second polymeric layer, the tabs comprising an elastic material, wherein
   the sealed storage tank is configured to hold at least 13,000 liters.

2. The sealed storage tank of claim 1, wherein a major dimension of the first polymeric layer is larger than a major dimension of the second polymeric layer.

3. The sealed storage tank of claim 2, wherein the first and second major dimensions are a first diameter and a second diameter.

4. The sealed storage tank of claim 1, wherein the first polymeric layer, second polymeric layer, or both independently comprise a polyolefin, a polyketone, a polyester, a polyamide, ethylene vinyl alcohol, a polyvinylidene fluoride, a polyvinylidene chloride, a polyvinyl alcohol, a polytetrafluoroethylene, copolymers thereof, or mixtures thereof.

5. The sealed storage tank of claim 4, wherein the polyolefin comprises a polyethylene, a polypropylene, copolymers thereof, or mixtures thereof.

6. The sealed storage tank of claim 1, wherein the sealed storage tank has a volume in a range of from about 13,000 liters to about 12,270,000 liters.

7. The sealed storage tank of claim 1, wherein a permeability of the sealed storage tank to a volatile organic compound is in a range of from about $1 \times 10^{-14}$ m²/s to about $30 \times 10^{-14}$ m²/s.

8. The sealed storage tank of claim 7, wherein the volatile organic compound comprises an aromatic hydrocarbon, a chlorinated hydrocarbon, or a mixture thereof.

9. The sealed storage tank of claim 8, wherein the aromatic hydrocarbon comprises benzene, toluene, ethylbenzene, xylene, or a mixture thereof.

10. The sealed storage tank of claim 8, wherein the chlorinated hydrocarbon comprises 1,2-dichloroethane (1,2-DCA), dichloromethane (DCM), trichloroethylene (TCE), tetrachloroethylene (PCE), or a mixture thereof.

11. The sealed storage tank of claim 7, wherein the volatile organic compound is a constituent of oil.

12. The sealed storage tank of claim 1, wherein the first polymeric layer, second polymeric layer, or both comprise a multi-layer construction comprising:
    a first polyolefin layer;
    a barrier layer;
    a first tie layer joining the first polyolefin layer and the barrier layer;
    a second polyolefin layer; and
    a second tie layer joining the barrier layer and the second polyolefin layer.

13. An assembly comprising:
    the sealed storage tank of claim 1; and
    a container, wherein the sealed storage tank is attached to the container.

14. The assembly of claim 13, wherein the container is a metal container, a plastic container, an earth berm, or a combination thereof.

15. A method of making the sealed storage tank of claim 13, the method comprising:
    sizing the first polymeric layer to be larger than the second polymeric layer;
    contacting the first polymeric layer and the second polymeric layer; and
    forming a continuous weld between the first polymeric layer and the second polymeric layer to form the sealed storage tank.

16. The method of claim 15, further comprising attaching a fitting to first polymeric layer, second polymeric layer, or both.

17. The method of claim 16, wherein attaching the fitting comprises:
    forming a hole in the first polymeric layer, second polymeric layer, or both;
    disposing the fitting in the hole; and
    welding the fitting to the first polymeric layer, second polymeric layer, or both.

18. The method of claim 15, further comprising attaching the plurality of tabs to the first polymeric layer, second polymeric layer, or both.

19. The method of claim 15, further comprising substantially aligning a center of the first polymeric layer with a center of the second polymeric layer.

20. A method of forming the assembly of claim 13, the method comprising:
    forming the sealed storage tank; and
    attaching the sealed storage tank to the container.

21. The method of claim 20, wherein attaching the sealed storage tank to the container comprises:
    folding at least one of the plurality of tabs over a top end of the container; and
    clamping the at least one tab to the top end of the container.

22. The method of claim 20, wherein attaching the sealed storage tank to the container comprises:
    folding at least one of the plurality of tabs over a top end of the container; and
    welding the at least one tab to the top end of the container.

23. The method of claim 20, further comprising disposing a liner between an inner surface of the container and the sealed storage tank.

* * * * *